United States Patent [19]

Martin

[11] Patent Number: 5,156,895
[45] Date of Patent: Oct. 20, 1992

[54] MONOLITHIC AEROGEL INSULATION CAST AND DRIED WITHIN A SUPPORT STRUCTURE AND METHOD

[75] Inventor: Marlo R. Martin, Berkeley, Calif.

[73] Assignee: Thermalux, A Limited Partnership, Richmond, Calif.

[21] Appl. No.: 471,101

[22] Filed: Jan. 26, 1990

[51] Int. Cl.⁵ ............................................. B32B 3/00
[52] U.S. Cl. .................................... 428/72; 428/73; 428/76; 428/116; 428/117; 428/118; 423/338
[58] Field of Search ............... 428/117, 72, 73, 68, 428/76, 118, 331, 116; 423/338

[56] References Cited

U.S. PATENT DOCUMENTS

| | | | |
|---|---|---|---|
| 3,982,057 | 9/1976 | Briggs et al. | 428/73 |
| 3,998,024 | 12/1976 | Frandsen | 428/117 |
| 4,265,688 | 5/1981 | Gorski | 428/73 |
| 4,299,872 | 11/1981 | Miguel | 428/117 |
| 4,335,174 | 6/1982 | Belko | 428/73 |
| 4,365,135 | 12/1982 | McWilliams | 428/409 |
| 4,564,547 | 1/1986 | Hughes | 428/117 |
| 4,610,863 | 9/1986 | Tewari | 423/336 |
| 4,667,417 | 5/1987 | Graser | 423/338 |
| 4,988,406 | 1/1991 | Nelson | 428/76 |

FOREIGN PATENT DOCUMENTS

| | | | |
|---|---|---|---|
| 3612579 | 10/1987 | Fed. Rep. of Germany | 428/72 |
| 1390968 | 4/1975 | United Kingdom | 428/73 |

*Primary Examiner*—Ellis P. Robinson
*Assistant Examiner*—Nasser Ahmad
*Attorney, Agent, or Firm*—Fliesler, Dubb, Meyer & Lovejoy

[57] ABSTRACT

A body 20 includes a support structure 30 in which is formed monolithic aerogel 32 and has terminal insulating properties or other desirable properties. The body 20 can be enveloped in an impermeable membrane 34, 36 so as to allow a vacuum or another environment to be contained in the aerogel 32. The support structure 38 can include individual cells 22, each of which can support its own independent environment which is unaffected by the accidental or planned interruption in the environment of any adjacent cell 22.

25 Claims, 7 Drawing Sheets

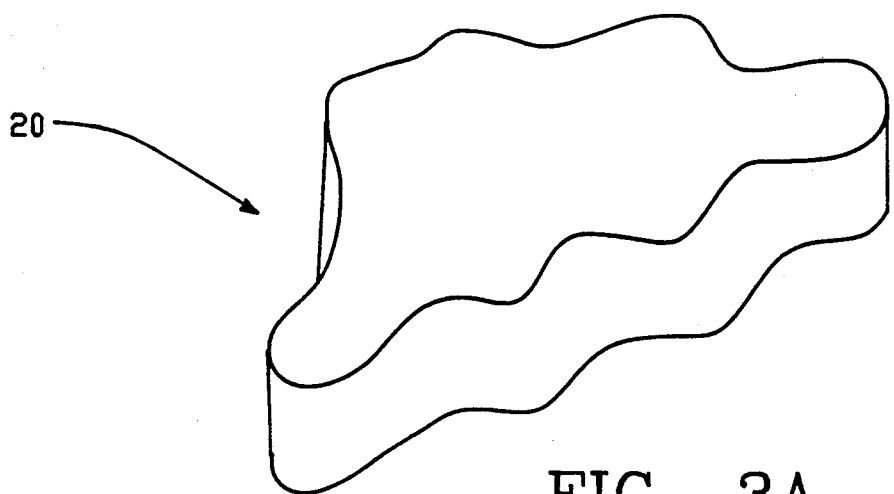
FIG.—3A
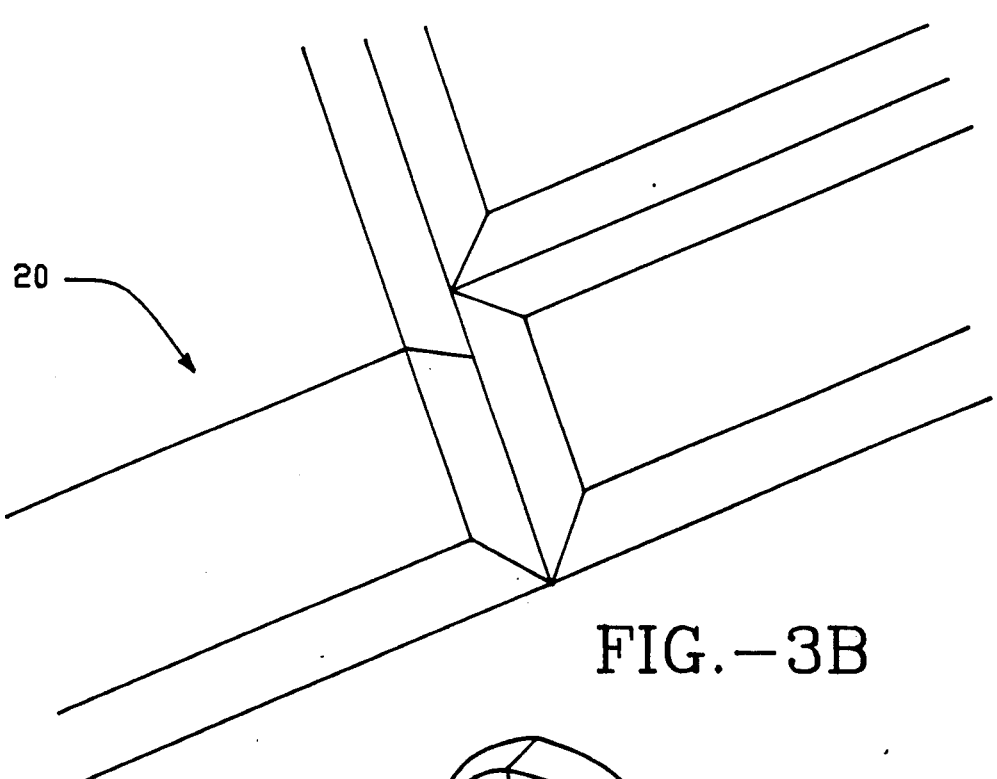
FIG.—3B
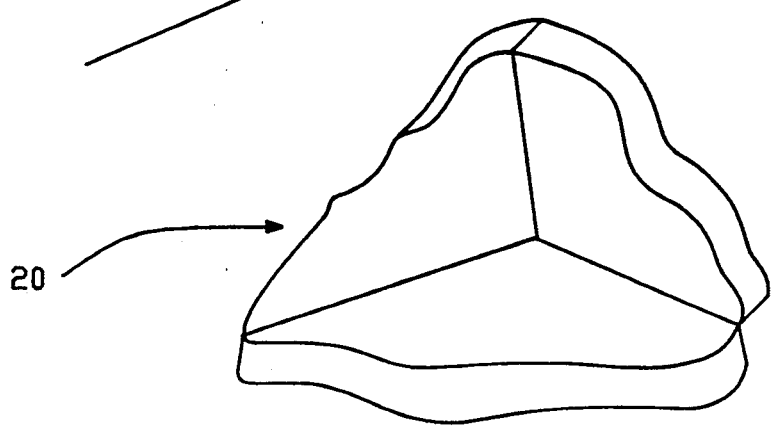
FIG.—3C

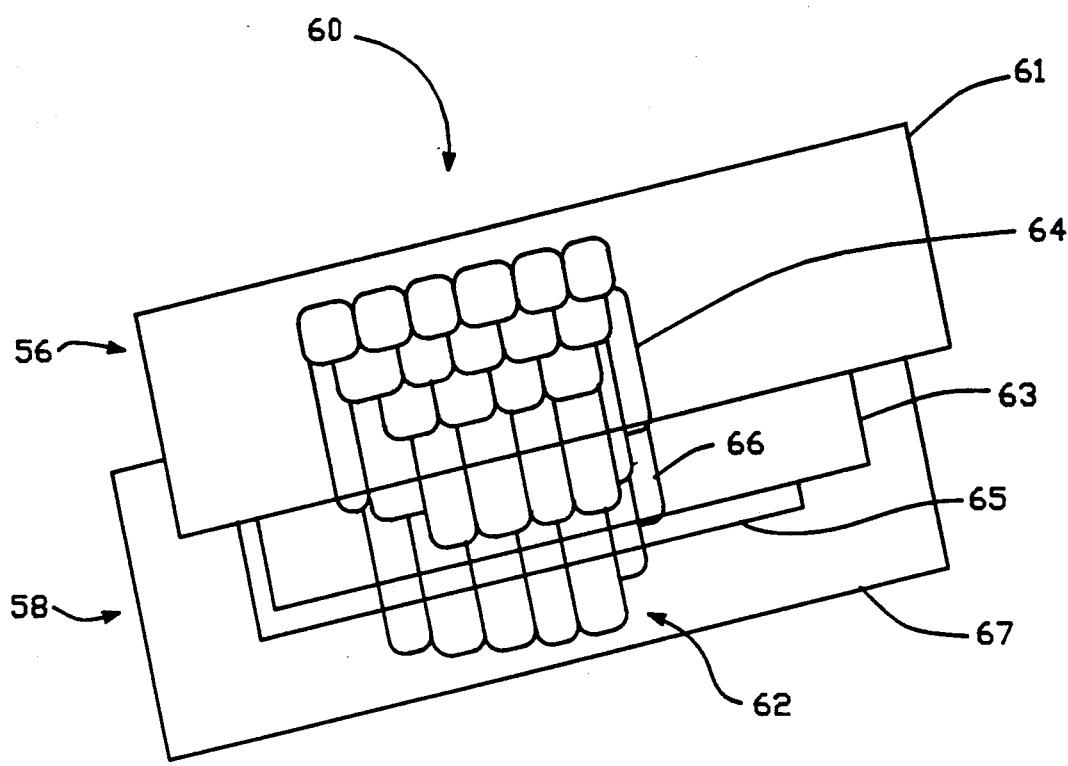
FIG.—4
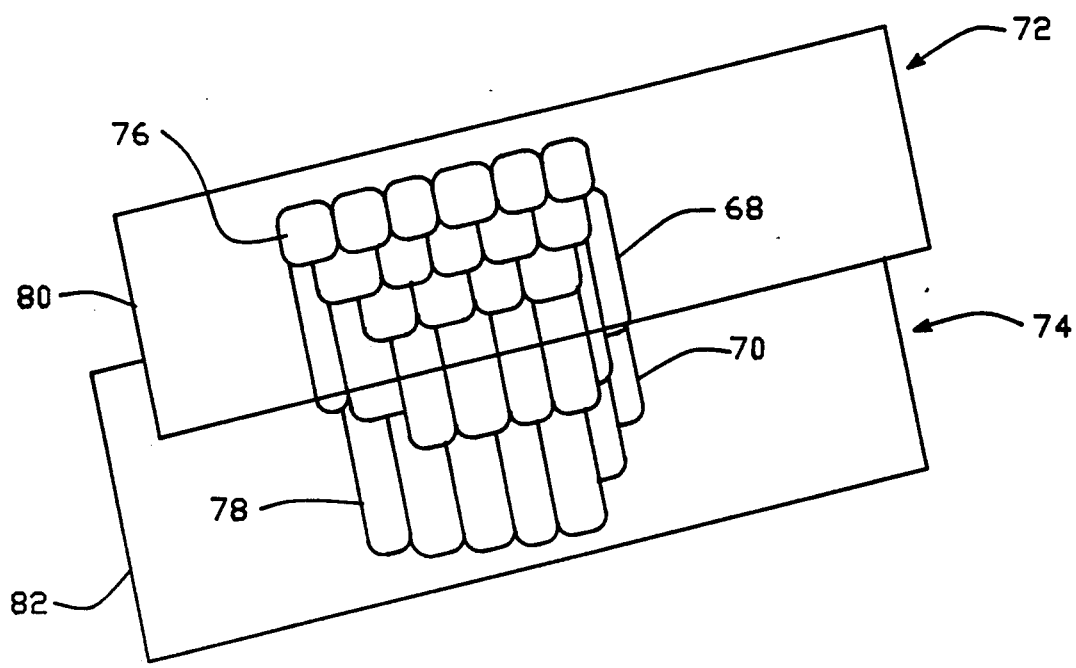
FIG.—5

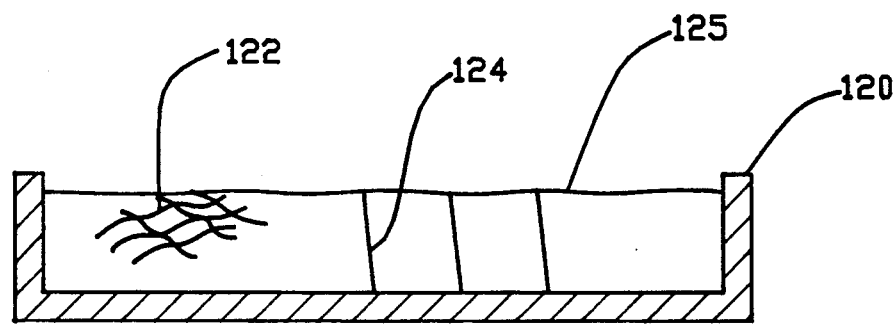
FIG.—8A
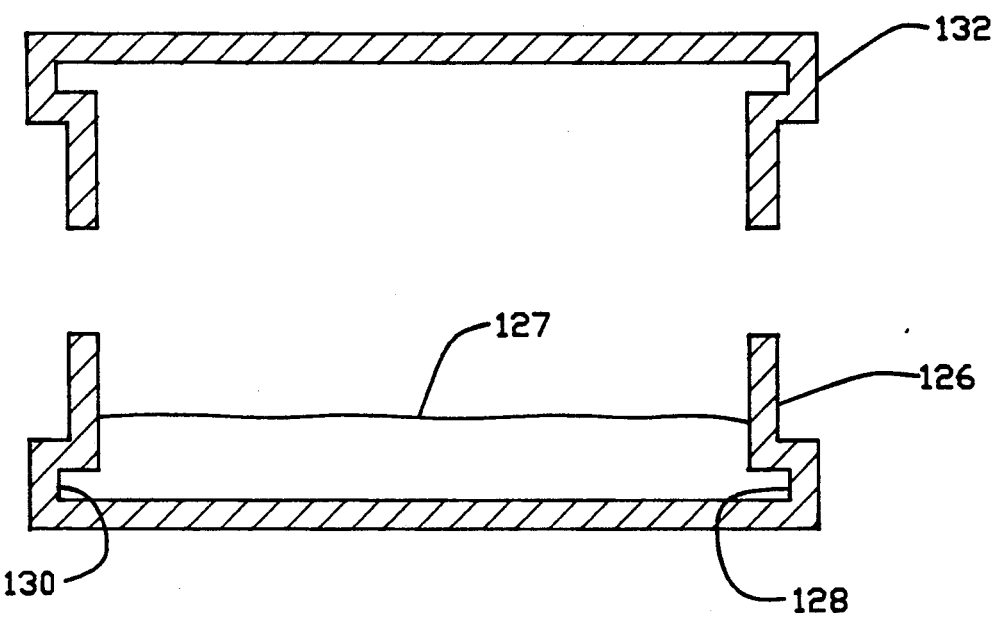
FIG.—8B

MONOLITHIC AEROGEL INSULATION CAST AND DRIED WITHIN A SUPPORT STRUCTURE AND METHOD

FIELD OF THE INVENTION

The present invention is related to support structures which contain aerogels for purposes of providing enhanced insulation and for other purposes.

BACKGROUND OF THE INVENTION

A method is known whereby finely divided aerogel powders are compacted into the cells of a honeycomb-like structure to provide thermal insulation and support for the thin walled membrane of the structure. This method is disclosed in U.S. Pat. No. 4,564,547 entitled "HANDLEABLE SHAPES OF THERMAL INSULATION MATERIAL", which lists as the inventor, John T. Hughes, and the assignee as Micropore International, Ltd. and has an issue date of Jan. 14, 1986. This patent is incorporated herein by reference. A further patent which deals with fusing a protective skin on, and forming shapes from, blocks of microporous thermal insulation material, which can be of a powdery consistency and include compacted silica-aerogel particles, is U.S. Pat. No. 4,365,135 entitled "SHAPING OF THERMAL INSULATION MATERIALS", which lists the inventor as, Joseph A. McWilliams, and the assignee as Micropore International, Ltd. and has an issued date of Dec. 21, 1982. This patent is also incorporated herein by reference. As is evident in the Hughes patent, careful attention is paid in the compaction step due to the fact that the aerogel powder contains substantial trapped air and demonstrates a characteristic springiness when forced into a confined area. Hughes for example uses a ram with a porous surface or with apertures provided therethrough in order to allow air to be released as the ram compresses the aerogel into the structure. With compaction however, the aerogel particles are forced closer and closer together allowing for greater heat conduction between particles and between the particles and the supporting structure and thereby reducing the thermal insulation properties of the final material.

The McWilliams patent details using laser cutting operations for obtaining desired shapes of thermal insulation material which, as with Hughes, have been formed by compacting aerogel particles into a handleable block material. Such processes are disadvantageous as there can be substantial waste due to the trimmed portions of the block which are not used, and each additional cutting step must be carried out so as not to substantially disturb the compacted aerogel particles.

SUMMARY OF THE INVENTION

The present invention comprises a cellular support structure into which gels are formed. The gels, which can include alcogels, hydrogels and other gels (as by way of example only, are defined in and hereby incorporated by reference U.S. Pat. No. 4,610,863 entitled "PROCESS FOR FORMING TRANSPARENT AEROGEL INSULATING ARRAY" listing Param H. Tewari and Arlon J. Hunt as inventors and U.S. Pat. No. 4,667,417 entitled "PREPARATION OF AEROGELS" and listing Fritz Graser and Andreas Stange as inventors), are then subjected to a drying process capable of removing interstitial liquid from the gels and forming a thermal insulating microporous monolithic aerogel matrix which is imbedded in the support structure.

The invention further provides for an impermeable membrane, which may be impermeable to gases and liquids, and which is provided in sealing contact with the support structure in order to envelop the support structure and the aerogel contained therein. Secured to the support structure, the impermeable membrane adds additional structural strength to the structure. The impermeable membrane allows a vacuum to be created within the aerogel greatly enhancing its thermal resistance and the overall strength of the structure. Alternatively, a gas can be introduced into the impermeable membrane to accomplish desired results. For example, gases can be introduced to enhance the ability of the structure to resist fire.

The support structure itself can be comprised of a gas and/or liquid impermeable material which is formed into a plurality of cells. The impermeable membrane can be provided to envelop the structure and seal each cell after a vacuum is provided in each cell in order to provide a plurality of cells, each having an independent vacuum. Such an arrangement is highly advantageous in that should one or several cells be punctured, the thermal and structural integrity of the structure is not compromised. Such a structure can be successfully machined and/or otherwise milled into a desired shape without compromising the thermal or structural integrity of the final product.

Further, the insulating body can be comprised of a number of layers of cells, which cells of one layer are misaligned with the cells of another layer in order to impede thermal conductivity through the structure.

Accordingly, and in comparison with the prior art, the present invention provides for a support structure which has a microporous monolithic aerogel material formed therein to add structural strength and thermal insulation to the support structure. As the low density monolithic aerogel is formed within the structure, as opposed to having a high density aerogel powder compacted into the structure, the thermal resistance of the structure is much greater. Further the addition of a vacuum contained within an impermeable membrane surrounding the structure and the aerogel, greatly enhances the thermal resistance of the structure and increases the strength and integrity of the structure.

The present invention further includes a method of forming the support structure containing a microporous monolithic aerogel. One aspect of the method includes a solvent substitution step and a supercritical drying step.

Accordingly, it is object of the present invention to provide a cellular support structure having a plurality of cells containing an aerogel for providing structural strength and thermal resistance.

It is a further object of the present invention to provide a cellular support structure with an impermeable membrane provided thereabout in order to contain a vacuum so as to greatly increase the structural integrity and the thermal resistance of the structure.

It is another object of the present invention to provide a support structure comprised of an impermeable material defining a plurality of cells filled with monolithic aerogel and an impermeable membrane enveloping the structure so that each of the cells can maintain an independent vacuum which is uncompromised should an adjacent cell become punctured, cut or otherwise lose vacuum.

It is a further object of the present invention to provide for a support structure which has each cell provided with an independent vacuum so that the structure can be machined to any desired shape without interfering with the general integrity of the vacuum maintained in the cells within the defined shape.

BRIEF DESCRIPTION OF THE FIGURES

FIG. 3A, 3B and 3C depict representative shapes which can be configured according to the invention;

FIG. 4 depicts a further embodiment of the invention;

FIG. 5 depicts another embodiment of the invention; and

FIGS. 8A and 8B depict another embodiment of the present invention.

DETAILED DESCRIPTION OF THE PREFERRED EMBODIMENT

Figure 1A:
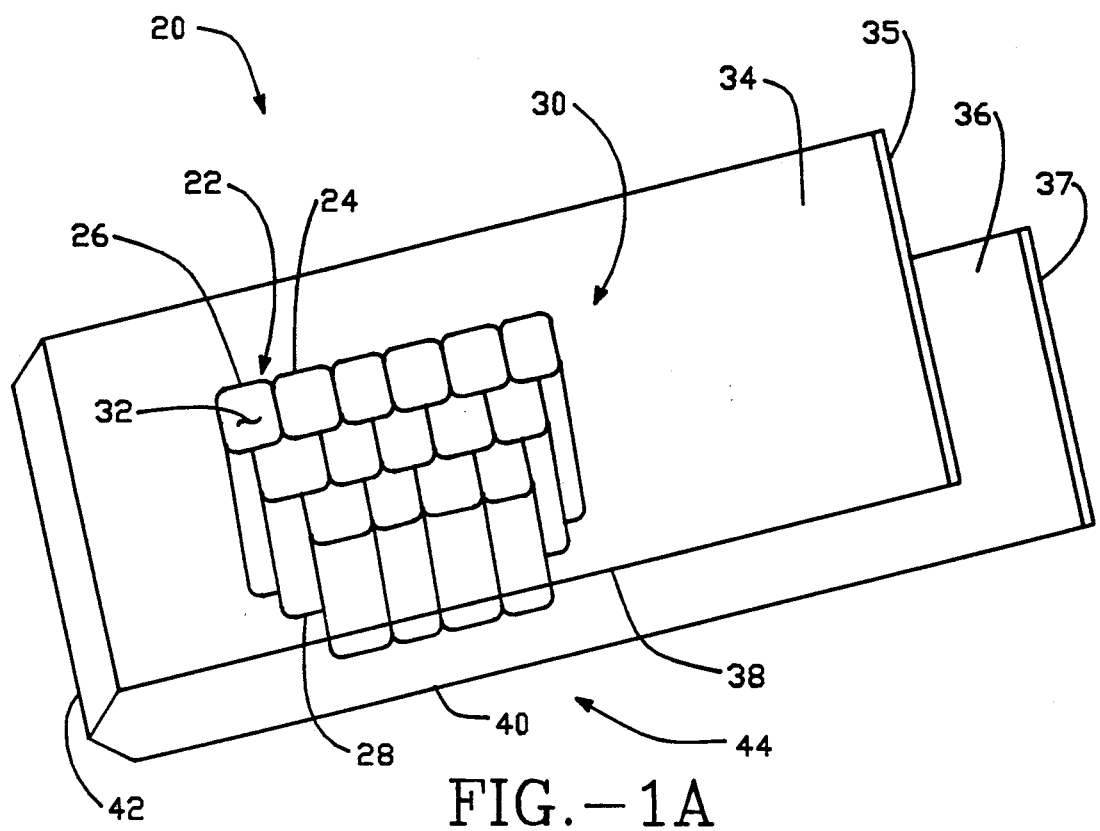
FIGS. 1A and 1B depict preferred embodiments of the invention.
Figure 1B:
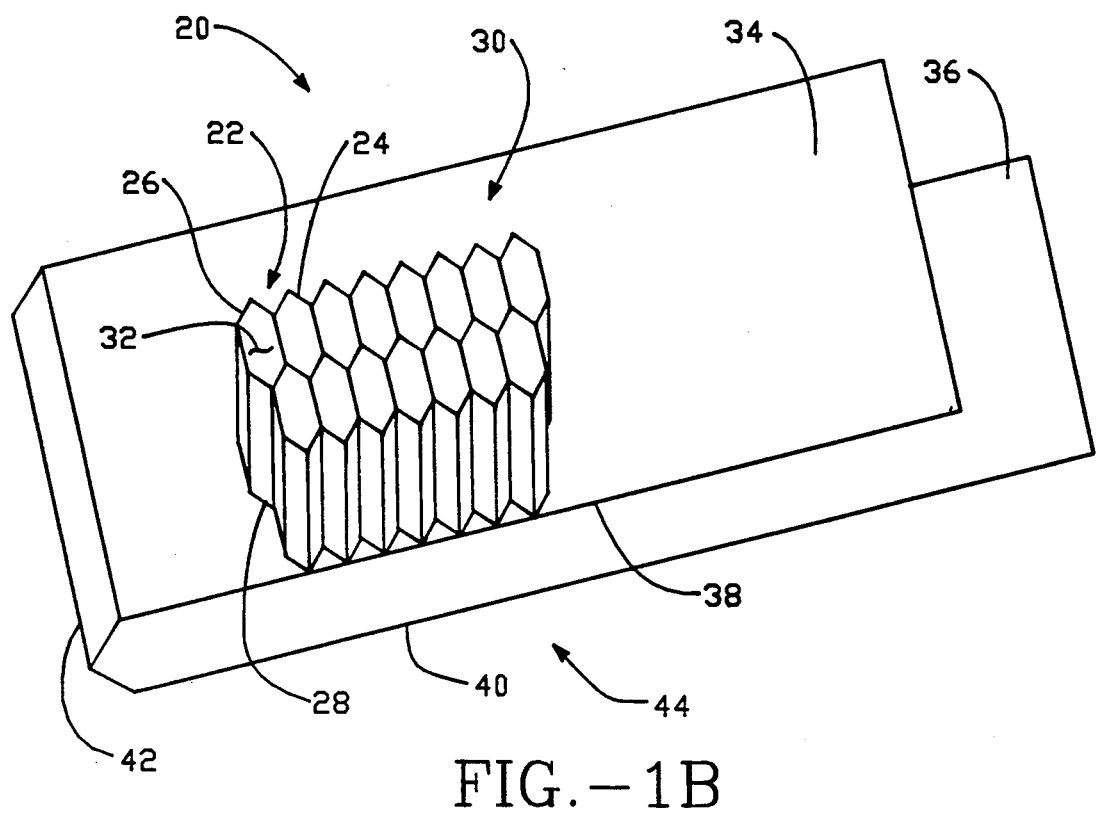

With reference to the figures and in particular to FIGS. 1A and 1B, a body 20 of the invention is depicted which has in accordance with the invention, thermal resistance or thermal insulating qualities. It is to be understood that this body has other qualities, which be described hereinbelow, which make the body 20 suitable for use in areas where thermal insulating qualities may be of little or no importance.

Body 20 includes a plurality of cells 22 which are each defined by cellular walls 24. In a preferred embodiment, the cells are right cylinders which define first and second openings 26, 28. It is to be understood that cells having shapes other than right cylinders can be included in the invention. Further, the cells may have a variety of cross-sectional configurations. The cells 22 in FIGS. 1A and 1B, for example, have circular and honeycomb or hexagonal shaped cross-sections, respectively. Further, other repeating and non-repeating cross-sectional patterns can be used and fall within the scope of the invention.

In a preferred embodiment, the cellular walls 24 are comprised of a gas and liquid impermeable material which is commonly available in the trade. Alternatively, construction paper, glass, ceramics, metals and a substantially unlimited variety of materials can be used to form the cells of a support structure 30.

Figure 2:
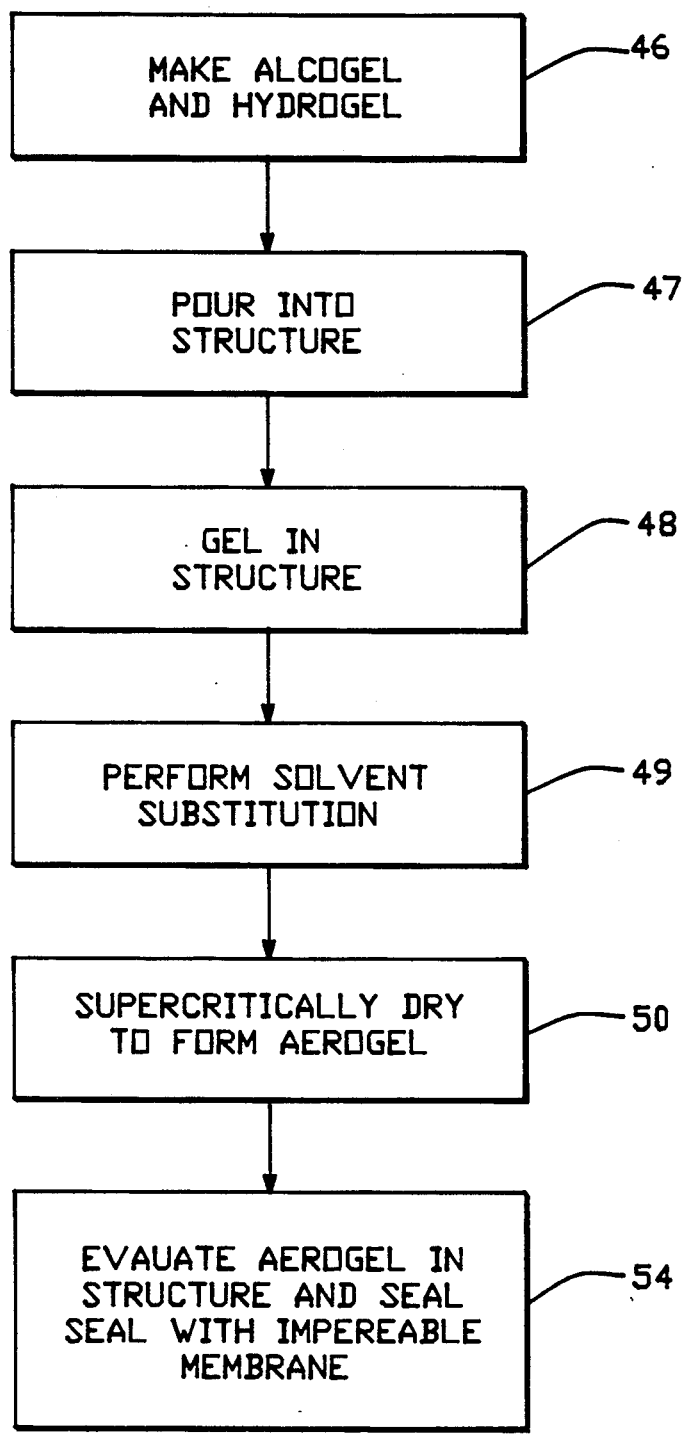
FIG. 2 depicts a schematic representation of a method of the invention.

As will be more fully described with respect to FIG. 2, monolithic aerogel 32 is provided in each of the cells 22. This aerogel, in accordance with the method of the invention, can include fibers, powders, netting, screening, matting, foil, absorbing or scattering particles such as a titanium dioxide or carbon black, and other materials which provide qualities, by way of example only, such as reinforcing qualities and qualities which either reflect or absorb thermal infrared radiation.

A first gas and liquid impermeable membrane 34 is provided in sealing contact with a first plurality of openings 26 in the cells 22. A second gas and liquid impermeable membrane 36 is provided in sealing contact with the second plurality of openings 28. Thus, with the cell walls 24 being comprised of fluid impermeable material, each of the cells can independently support a vacuum as provided for by the method shown in FIG. 2 in order to greatly enhance the thermal insulating capabilities and structural strength and integrity of the body 20. It is to be understood that instead of providing a vacuum in the cells, various gases can be introduced into the cells by, for example, fluid substitution methods, in order to develop other characteristics, such as fire retardant characteristics, which may be desirable. Further, low emissivity coatings 35, 37 can be placed on or incorporated with the membranes 34, 36.

The peripheral edges 38 and 40 of the first and second membranes 34, 36 can be joined together as is shown at line 42 so that first and second membranes 34, 36 define a complete envelope 44 about the body 20.

With respect to FIG. 2, a method for making the body 20 of the invention is depicted. This method uses an alcosol or hydrosol or other suitable starting material which is gelled within the structure and then goes through a solvent substitution step and a supercritical drying step in order to produce a microporous monolithic aerogel in the body 20. It is possible to eliminate the solvent substitution step if the liquid contained in the gel is directly subjected to the surpercritical drying process to form an aerogel.

A process for producing aerogel is more fully described in U.S. Pat. No. 4,610,863 entitled "PROCESS FOR FORMING TRANSPARENT AEROGEL INSULATING ARRAY", listing as the inventors Param H. Tewari and Arlon J. Hunt, and having an issue date of Sep. 9, 1986, which patent is incorporated herein by reference. A further U.S. Pat. No. 4,667,417 entitled "PREPARATION OF AEROGELS" having Fritz Graser and Andreas Stange as inventors and issued on May 26, 1987 describes an alternate approach to the production of aerogels, which patent is also incorporated herein by reference.

By way of example only, the alcosol can be made using a sol-gel process of hydrolysis and polycondensation reactions of silicon alkoxides in alcohol (block 46).

Alternatively, the starting material can be a hydrosol as described by the above referenced U.S. Pat. No. 4,667,417. Further still, other starting materials can be used.

The mixture is then poured into the structure 30 (block 47) and allowed to gel (block 48). After the gelation, the gels are aged.

The support structures 30, including the alcogels are placed in a chamber for the solvent substitution step (block 49). In one embodiment of the invention, the gel is immersed in an alcohol bath to remove any remaining solvents and water. The structures are then placed in a pressure chamber then sealed, cooled, and pressurized with liquid $CO_2$. Next repetitive purging is utilized to displace the alcohol. When the alcohol is removed, the temperature is raised to 40° C. while the pressure is raised to and maintained at 1200 psi. This describes one method by which the supercritical drying step (block 50) can be accomplished. Next the $CO_2$ is slowly vented and when atmospheric pressure is reached, the gels are then removed. The final step (block 54) for some embodiments of the invention is to provide a gas and liquid impermeable membrane 34, 36 about the support structure 30 containing the aerogel 32 and to provide a vacuum within the support structure 30 and aerogel 32 as enveloped by the membrane 34, 36. A vacuum can be provided by placing the support structure 30 and aerogel 32 into a chamber and then evacuating the chamber. A gas and liquid impermeable membrane can then be heat sealed or applied with an adhesive to the structure. For heat sealing or adhering the membrane to the structure, rollers can be used to press the membrane against the structure and against another layer of membrane at the ends of the structure. Alternatively, a membrane can be formed by condensations and polymerization of a monomeric vapor.

A great advantage of making the body 20 in accordance with the embodiment of FIG. 1, in which the cell walls are made from a material impermeable to air or other gases, is that a multiplicity of shapes can be machined or otherwise cut as shown, for example in FIG. 3A, without disturbing the thermal insulating or other properties of the body 20. As each cell maintains its own vacuum or other environment containing desirable gases or liquids, a cutting process will only affect the cells on the periphery which are actually cut and not the cells comprising the field of the shape. Further as can be seen in FIG. 3B, a desired shape can be machined into the support structure 30 prior to the formation of the aerogel in the individual cells. As is evident in FIG. 3B, a substantially planar support structure has been developed with provisions for bending the structure at desirable locations. Once the aerogel is formed within the cells of the structure, the structure can be folded up as is shown in FIG. 3C. A multiplicity of other forms and shapes are possible.

Embodiments of the invention can be configured to have two or more layers in order to greatly enhance the thermal insulating properties and other desirable properties. In FIGS. 4 and 5, two layers of cells are presented. In FIG. 4, both the first and second layers 56, 58 are formed separately in accordance with the embodiment of FIG. 1. After each of these layers is formed and a vacuum is provided in each cell, the layers are enveloped in impermeable membranes 61, 63 and 65, 67, which seal the cells. The two layers are then mated together but with the cells of the first layer offset from the cells of the second layer in order to inhibit the conduction of heat from the cells of the first layer through the cell walls of the second layer. Thus, as can be seen in FIG. 4, when the cells 60 of first layer 56 and the cells 62 of the second layer 58 are substantially formed and shaped as right cylinders, with the cell walls 64 of cells 60 being substantially parallel to the cell walls 66 of cells 62, these cell walls 64 are offset from and not in line with the cell wall 66 in order to as indicated above, prevent the conduction of thermal energy from the cell walls 64 through the cell walls 66. Further, to reduce thermal conduction, the cell walls themselves can be made thin to reduce the cross-sectional conduction area or can be made of materials that are not good thermal conductors.

FIG. 5 depicts another embodiment which can accomplish the same purpose of FIG. 4 with fewer steps. In this embodiment, the support structure 68 of a first layer 72 of cell 76 is mated to a second support structure 70 including a second layer 74 having cells 78. The cells in this embodiment are substantially right prisms or cylinders. However, it can be understood that other cell configurations can be used. In this embodiment, the cells 76 of layer 72 are parallel to but not aligned with the cells 78 of layer 74. However, the interior of the cells 76 to some extent can communicate with the interior of cells 78. This allows for aerogel to be formed continuously in both the first and second layers 72, 74 at the same time. Once this is accomplished impermeable membranes 80, 82 envelope the support structure 68, 70 and the aerogel formed therein so as to contain a vacuum or other environment within the aerogel formed in support structure 68, 70.

Figure 6:
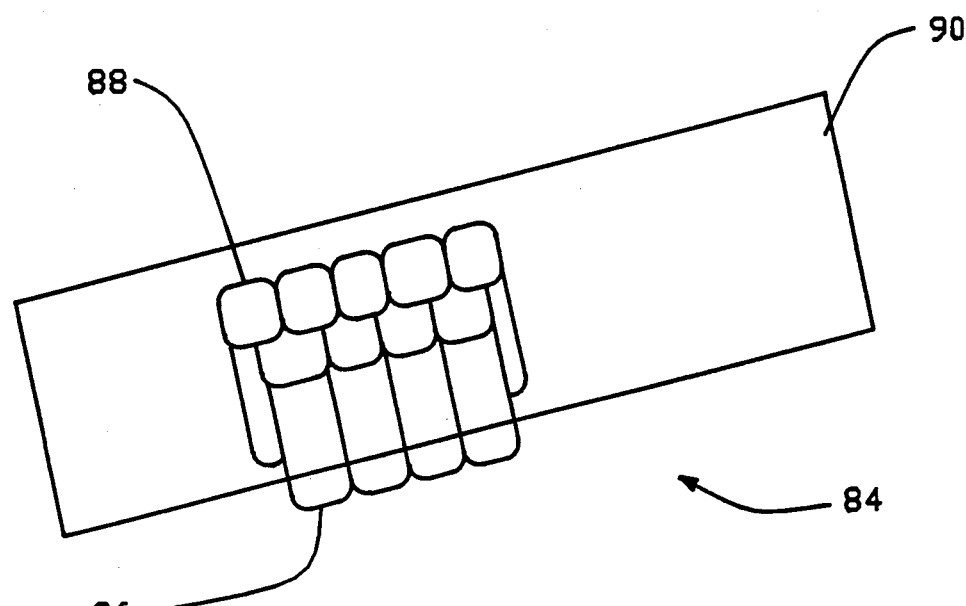
FIG. 6 depicts yet another embodiment of the invention.

Another embodiment of the present invention is shown in FIG. 6. In this figure the support structure 84 is comprised of a plurality of vessels 86 which only have openings 88 at one end of the vessels 86. The vessels 86 can be filled with the appropriate materials and gels formed therein. A single impermeable membrane 90 is then required to seal the openings 88 in order to maintain any desired environment in each vessel 86.

Figure 7A:
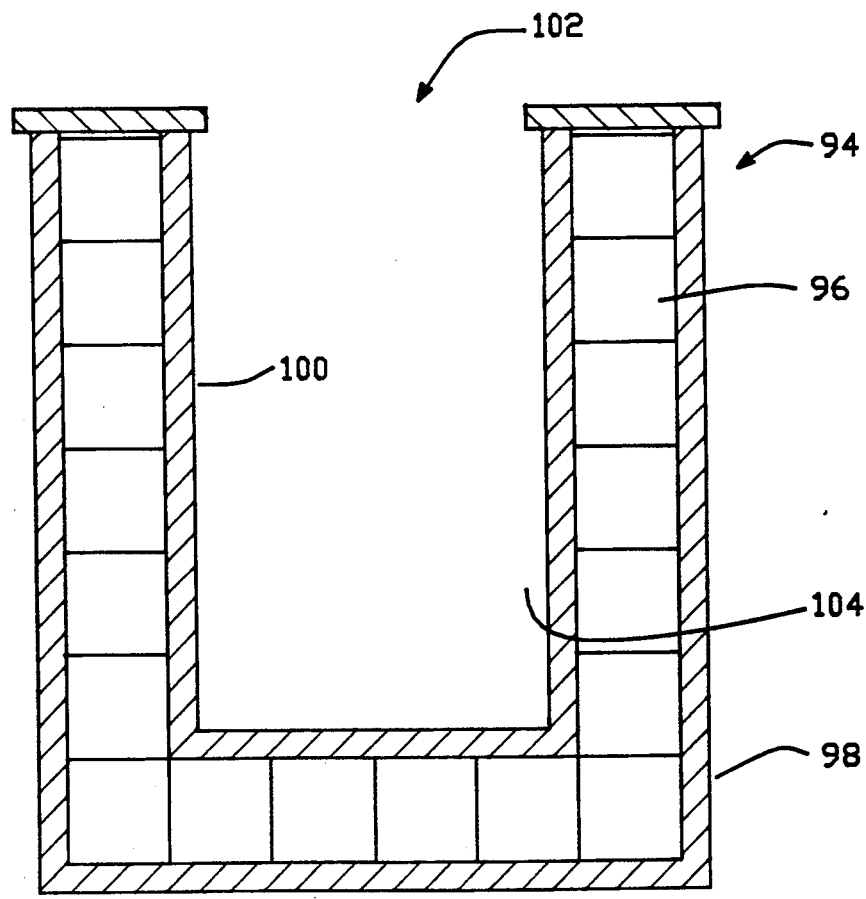
FIGS. 7A, 7B and 7C depict still another embodiment of the invention.
Figure 7B:
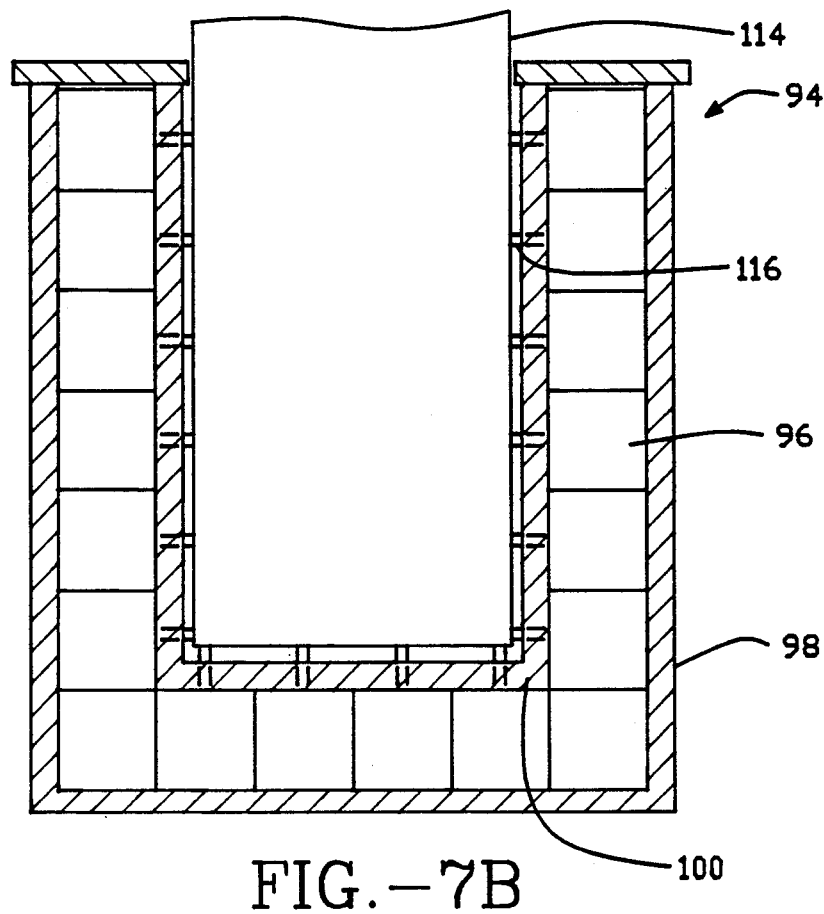
Figure 7C:
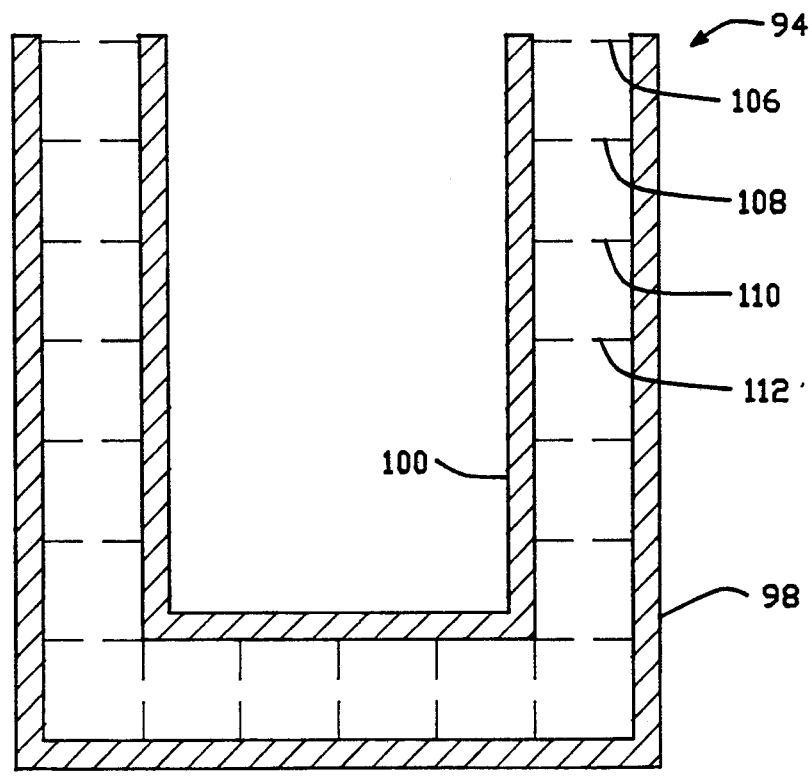

FIGS. 7A, 7B and 7C depict yet another embodiment of the present invention. In this embodiment the support structure 94 which is comprised of a plurality of cells 96 is formed in the shape of a vessel, a cross-sectional view of which is shown in FIG. 7A. In this embodiment, support structure 94 is formed and then the sol is poured into the cells and allowed to gel and age there. Once this has been accomplished along with a solvent substitution and a drying step, gas impermeable membranes 98, 100, 102 can be applied to define an internal chamber 104 which can be used to hold a gas or maintain a vacuum.

It is to be understood that the alcosol or hydrosol and the like can be poured into the support structure 94, as shown in FIG. 7C, through an opening such as opening 106 at the upper end of the structure 94. The alcosol or hydrosol can then fill up the multiplicity of cells within the support structure 94 by passing through successive ports, such as ports 108, 110, 112 in each cell which allows passage of the material from cell to cell until all of the cells are filled. In this arrangement, it would be advantageous to provide membranes such as membranes 98 and 100 around the surfaces of the support structure prior to filling the cells in order to keep the alcosol or hydrosol within the cells.

As shown in FIG. 7B, another method of introducing the alcosol or hydrosol into the various cells would be to cause an introduction system 114 to be placed inside the chamber 104. The introduction system 114 would include a plurality of conduit such as conduit 116, one of which would be provided to each of the cells in order to fill the cell with the appropriate material. The introduction system would be kept in the chamber 104 until the sols had gelled.

Another embodiment of the present invention can be seen in FIGS. 8A and 8B. In FIG. 8A the support structure 120 is comprised of glass, ceramics, or other material. In a preferred embodiment one half of a commercially available glass building block is used. Into the support structure 120 the alcosol or hydrosol can be poured, a gel formed, solvent substitution performed along with supercritical drying to form the aerogel structure within the support structure. The aerogel is not removed, but remains with the support structure, such as for example the glass brick, and then used wherein enhanced insulation, absorption or reflection properties are required. Further it is to be understood that for purposes of strength and other qualities, materials such as fibers 122 and/or honeycomb structure 124 can be introduced into the alcosol before a gel has formed to provide the desired properties.

As can be seen in FIG. 8B, a standard glass block or other standard support structure 126 can be modified to include indentations such as indentations 128, 130 into which the alcosol or hydrosol can be poured and the above process carried out in order to form aerogels. In such an arrangement, the aerogel is formed in the indentation and thereby is appropriately held in the support structure 126. After this has been accomplished, a second structure 132 can be mated to the first structure 126 to form in this preferred example, a complete glass building block.

Industrial Applicability

From the above, it can be seen that the present invention provides for a thermal insulating body which is far superior to the prior art. Based on the above, it is evident that the present invention provides for an insulating body which (1) has high thermal insulation properties provided in a relatively small thickness; (2) has high compressive strength; (3) has the ability to withstand cutting in order to form the desired shape without requiring that the aerogel be fabricated into the desired shape as part of the aerogel production process; (4) has the ability to withstand the penetration of any individual cells throughout the slab without compromising the insulating properties nor other properties of the entire slab; (5) has the ability to be handled and sold in stores as a commodity, for example, as a panel instead of a specially fabricated item; (6) has the ability to be fabricated into unusual non-planar shapes; and, (7) can additionally have a multitude of additional properties from being fire and flame retardant to absorbing or reflecting infrared radiation and other properties depending on materials which can be included within the cells.

It is to be understood that as a relatively low temperature is employed in a preferred embodiment in order to dry the aerogel according to the process described in U.S. Pat. No. 4,610,863, a support structure can be comprised of a unlimited range of materials which will not decompose or otherwise be degraded by exposure to the drying process. In other words, a simple paper structure such as Kraft paper could be used as well as state of the art metals and ceramics and glass fibers and many other materials in order to provide the support structure. Further, a support structure can be fabricated in whatever desired shapes are required for, for example, use in airplanes or other vehicles, and/or enclosures such as building refrigeration or other temperature control units and the like. Further, it is to be understood that the aerogel can be impregnated with a variety of materials and resins which will accomplish a multitude of desired properties such as being fire resistant, and the low temperature drying process will not degrade the performance of such impregnation materials or compromise the impregnation materials altogether.

Further, it is to be understood that the present structure including just the support structure 30 and the aerogel 32 formed therein without the impermeable membranes enveloping the support structure can be used in order to support the aerogel for uses such as, just by way of example only, in extremely fine air filters for the semiconductor industry, catalyst carriers, substrates for enzymes, as adsorbents in adsorption processes including the trapping and removal of toxic substances and as acoustic matching devices.

Further objects of the invention can be obtained from a review of the claims and the figures. It is to be understood that other embodiments of the present invention can be made which fall within the spirit and scope of the claims hereof.

I claim:

1. A body comprising:

a support structure having a multiplicity of cells having cell walls; and a monolithic aerogel material formed in place in the multiplicity of cells by initially allowing a gel to be formed in the support structure in contact with the cell walls and which gel is then dried by removing the interstitial fluid within the gel.

2. The body of claim 1 wherein said monolithic aerogel material has thermal insulating properties.

3. A body according to claim 1 wherein:

each of said cell walls forming said cells define at least one opening; and an impermeable membrane provided in sealing contact with the opening of each of said cells, which impermeable membrane is impermeable to at least one of gas and liquid.

4. A body according to claim 1 wherein:

each of said cells define at least a first opening and a second opening;

wherein said first openings of said cells define a first surface;

wherein said second openings of said cell define a second surface;

a first impermeable membrane provided in sealing contact with the first openings, which first impermeable membrane is impermeable to at least one of gas and liquid; and a second impermeable membrane provided in sealing contact with the second opening, which second impermeable membrane is impermeable to at least one of gas and liquid.

5. The body according to claim 4 wherein:

said first impermeable membrane defines a first peripheral edge;

said second impermeable membrane defines a second peripheral edge;

said first peripheral edge is provided in contact with said second peripheral edge in order to provide an envelope about said support structure.

6. The body according to claim 1 including:

an impermeable membrane enveloping said support structure so that a vacuum can be provided within said support structure, which impermeable membrane is impermeable to at least one of gas and liquid.

7. The body according to claim 1 wherein:

said support structure is comprised of an impermeable material; and an impermeable membrane enveloping, and being in sealing contact with said support structure so that a vacuum can be maintained within any cell of the support structure independent of whether a vacuum is maintained in any other cell of the support structure, which impermeable membrane is impermeable to at least one of gas and liquid.

8. A body according to claim 1 wherein:

said support structure includes a first plurality of associated cells and located on a first plane a second plurality of associated cells located on a second plane; and wherein the cell walls of said first plurality of associated cells and the cell walls of said second plurality of associated cells are positioned adjacent each other but are not aligned so as to reduce thermal conductivity between the first and the second plurality of associated cells.

9. The body according to claim 8 wherein:

said cells have cylindrical cell walls; and said cell walls of said first plurality of associated cells are substantially parallel to but offset from the cell walls of said second plurality of associated cell walls.

10. The body according to claim 8 wherein:
said support structure is comprised of an impermeable material; and
an impermeable membrane enveloping, and being in sealing contact, with said support structure so that a vacuum can be maintained within any cell of the support structure independent of whether a vacuum is maintained in any other cell of the support structure, which impermeable membrane is impermeable to at least one of gas and liquid.

11. The body according to claim 8 wherein:
said support structure is comprised of an impermeable material;
a first impermeable membrane enveloping said first plurality of associated cells and a second impermeable membrane enveloping said second plurality of associated cells so that an independent vacuum can be maintained within the first and the second plurality of associated cells, which first and second impermeable membranes are impermeable to at least one of gas and liquid.

12. The body according to claim 1 wherein:
said cells are provided in the shape of a vessel capable of holding a gel.

13. The body according to claim 1 wherein an impermeable membrane is provided enveloping said support structure so that a gas can be maintained within said support structure.

14. The body according to claim 1 wherein:
additional material is provided in said gel in order to accomplish one of scattering, absorbing or scattering and absorbing thermal infrared radiation.

15. The body according to claim 1 comprising:
said support structure having predefined means for allowing said support structure to be configured into a shape after the monolithic aerogel material is formed in place.

16. The body of claim 1 including means for allowing said support structure to be reconfigured without causing discontinuities in the aerogel.

17. The body according to claim 1 wherein:
the support structure is made in the shape of a vessel capable of holding a fluid.

18. The body according to claim 17 wherein an impermeable membrane is provided enveloping said support structure so that a vacuum can be maintained in the support structure, which impermeable membrane is impermeable to at least gas and liquid.

19. A body comprising:
a support structure having an internal chamber defined by the walls of the support structure; and
a monolithic aerogel material formed in place in the chamber by initially forming a gel in the support structure in contact with the walls and which gel is then dried by removing the interstitial fluid within the gel.

20. The body of claim 19 wherein the support structure defines means communicating with said chamber within which the gel is formed for retaining the gel in the support structure.

21. The body of claim 20 wherein the retaining means includes recesses in the walls.

22. The body of claim 20 wherein the aerogel material includes means for increasing the structural strength of the aerogel materials.

23. The body of claim 20 wherein the aerogel material includes support fiber.

24. The body of claim 19 wherein the monolithic aerogel material has thermal insulating properties.

25. The body of claim 1 including:
an impermeable membrane enveloping said support structure formed by the deposit of monomeric vapors, which impermeable membrane is impermeable to at least one of gas and liquid.

* * * * *